United States Patent
Maeda et al.

(10) Patent No.: US 9,410,798 B2
(45) Date of Patent: Aug. 9, 2016

(54) STRAIN MEASUREMENT APPARATUS, LINEAR EXPANSION COEFFICIENT MEASUREMENT METHOD, AND CORRECTION COEFFICIENT MEASUREMENT METHOD FOR TEMPERATURE DISTRIBUTION DETECTOR

(71) Applicants: Osamu Maeda, Toyota (JP); Satoshi Ohya, Miyoshi (JP)

(72) Inventors: Osamu Maeda, Toyota (JP); Satoshi Ohya, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 694 days.

(21) Appl. No.: 13/658,424

(22) Filed: Oct. 23, 2012

(65) Prior Publication Data
US 2013/0107004 A1   May 2, 2013

(30) Foreign Application Priority Data
Oct. 26, 2011   (JP) .................................. 2011-234901

(51) Int. Cl.
*H04N 13/02* (2006.01)
*G01B 11/16* (2006.01)

(52) U.S. Cl.
CPC ............ *G01B 11/16* (2013.01); *H04N 13/0239* (2013.01)

(58) Field of Classification Search
CPC ....................................................... G01B 11/16
USPC ............................................ 348/46; 382/152
See application file for complete search history.

(56) References Cited

U.S. PATENT DOCUMENTS

| | | | |
|---|---|---|---|
| 5,483,421 A * | 1/1996 | Gedney et al. | 361/771 |
| 2002/0104870 A1* | 8/2002 | Nogawa | 228/4.5 |
| 2004/0093104 A1* | 5/2004 | Kaneto et al. | 700/97 |
| 2006/0222237 A1* | 10/2006 | Du et al. | 382/152 |
| 2011/0206399 A1* | 8/2011 | Fujita et al. | 399/49 |

FOREIGN PATENT DOCUMENTS

| | | | | |
|---|---|---|---|---|
| JP | 2008-232998 A | 10/2008 | | |
| JP | 2008232998 | * 10/2008 | ............ | G01N 25/20 |
| JP | 2009-270915 A | 11/2009 | | |
| JP | 2009270915 | * 11/2009 | ............ | G01B 11/25 |

* cited by examiner

*Primary Examiner* — Jamie Atala
*Assistant Examiner* — Kathleen Nguyen
(74) *Attorney, Agent, or Firm* — Dinsmore & Shohl LLP

(57) ABSTRACT

A strain measurement apparatus includes: a stereo camera device that produces a first stereo image and a second stereo image of a measurement object; an actual strain calculation portion configured to find a three-dimensional configuration of the measurement object from the first stereo image and the second stereo image to find actual strain of the measurement object; a temperature distribution detector that detects a temperature distribution of the measurement object; a free thermal strain calculation portion configured to find free thermal strain of the measurement object from the temperature distribution detected by the temperature distribution detector; and a constraint strain calculation portion configured to find as constraint strain of the measurement object a difference obtained by subtracting the free thermal strain found by the free thermal strain calculation portion from the actual strain found by the actual strain calculation portion.

9 Claims, 12 Drawing Sheets

F I G . 10
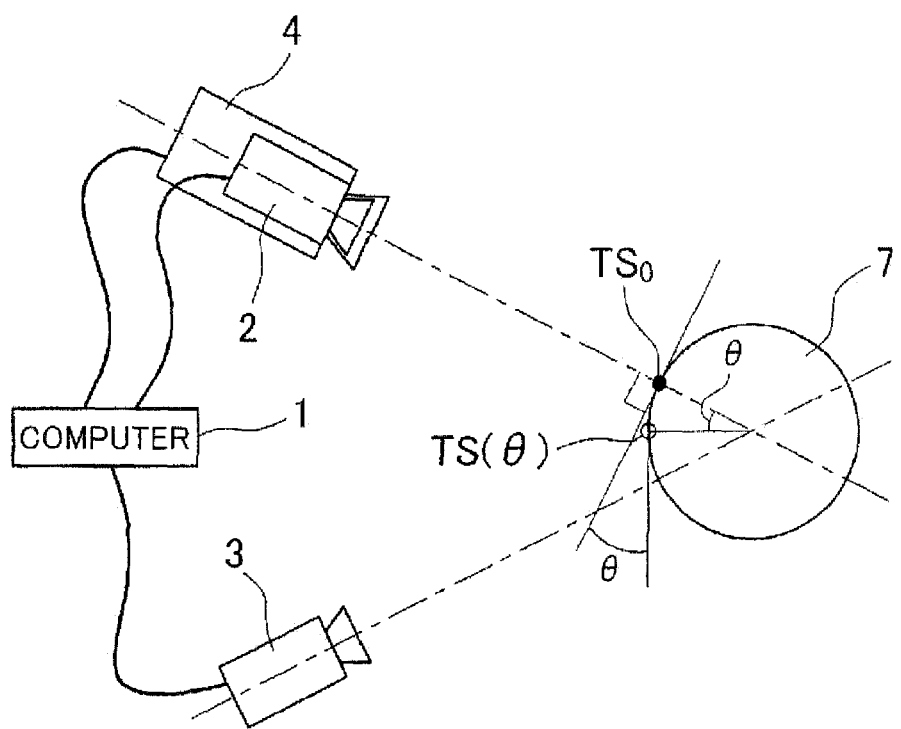

STRAIN MEASUREMENT APPARATUS, LINEAR EXPANSION COEFFICIENT MEASUREMENT METHOD, AND CORRECTION COEFFICIENT MEASUREMENT METHOD FOR TEMPERATURE DISTRIBUTION DETECTOR

INCORPORATION BY REFERENCE

The disclosure of Japanese Patent Application No. 2011-234901 filed on Oct. 26, 2011 including the specification, drawings and abstract is incorporated herein by reference in its entirety.

BACKGROUND OF THE INVENTION

1. Field of the Invention

The invention relates to a strain measurement apparatus, a linear expansion coefficient measurement method, and a correction coefficient measurement method for a temperature distribution detector.

2. Description of Related Art

With regard to component parts, such as an exhaust manifold or the like, of an exhaust system of an engine mounted on a vehicle, it is known that since the exhaust gas discharged from the engine has high temperature, thermal strain causes stress to occur, which affects the service life length. In order to evaluate the service life length of exhaust-system component parts of an engine, it is necessary to measure strain. To that end, various arts for measuring three-dimensional configurations have been proposed.

For example, there is disclosed a three-dimensional configuration measurement apparatus that measures a three-dimensional configuration of a measurement object by projecting a pattern onto the measurement object disposed in a picture-taking region of two cameras and acquiring stereo images of the measurement object with the projected pattern, and performing a stereo image processing of the acquired images (see Japanese Patent Application Publication No. 2009-270915 (JP 2009-270915 A)).

However, although the three-dimensional configuration measurement apparatus described in JP 2009-270915 A is capable of measuring the strain of a measurement object, the apparatus is not capable of finding the stress caused by thermal strain. That is, even when an exhaust system component part of an engine has a high temperature, the aforementioned stress does not occur if the exhaust system component part is allowed to freely expand, but the aforementioned stress occurs when the exhaust system component part is subjected to external constraint as is the case with a part connected to the engine, for example, and there is a temperature distribution in an engine exhaust system component part or the like.

That is, the above-described three-dimensional configuration measurement apparatus is not capable of measuring the strain that corresponds to the aforementioned stress (the stress caused by thermal strain) that affects the service life of a measurement object.

SUMMARY OF THE INVENTION

The invention provides a strain measurement apparatus capable of easily measuring strain corresponding to the stress caused by thermal strain in a constrained object, a linear expansion coefficient measurement method, and a correction coefficient measurement method for a temperature distribution detector.

A strain measurement apparatus in accordance with a first aspect of the invention is a strain measurement apparatus that includes: a stereo camera device that produces a first stereo image and a second stereo image of a measurement object; an actual strain calculation portion configured to find a three-dimensional configuration of the measurement object from the first stereo image and the second stereo image to find actual strain of the measurement object; a temperature distribution detector that detects a temperature distribution of the measurement object; a free thermal strain calculation portion configured to find free thermal strain of the measurement object from the temperature distribution detected by the temperature distribution detector; and a constraint strain calculation portion configured to find as constraint strain of the measurement object a difference obtained by subtracting the free thermal strain found by the free thermal strain calculation portion from the actual strain found by the actual strain calculation portion.

According to the strain measurement apparatus having the foregoing configuration, the first stereo image and the second stereo image of the measurement object are produced by the stereo camera device. Then, the three-dimensional configuration of the measurement object is found from the first stereo image and the second stereo image, and therefore the actual strain of the measurement object is found. Furthermore, the temperature distribution in the measurement object is detected by the temperature distribution detector, and the free thermal strain of the measurement object is found from the detected temperature distribution. Furthermore, a difference obtained by subtracting the found free thermal strain from the found actual strain is found as constraint strain of the measurement object. Therefore, the constraint strain of the measurement object, which is the strain corresponding to the stress caused by thermal strain in a constrained object, can easily be measured.

That is, in the strain measurement apparatus in accordance with the first aspect of the invention, the difference obtained by subtracting the free thermal strain, which is the strain of the measurement object resulting from free expansion caused by heat, from the actual strain, which is the actual strain of the measurement object, is defined as the "constraint strain" of a measurement object, and the thus-defined "constraint strain" is measured as an index for evaluating the service life length of the measurement object affected by thermal fatigue. Then, the strain measurement apparatus finds the actual strain from the first stereo image and the second stereo image produced by the stereo camera device, and finds the free thermal strain from the temperature distribution in the measurement object detected by the temperature distribution detector. Therefore, the strain measurement apparatus can easily measure the "constraint strain", which is the difference obtained by subtracting the free thermal strain from the actual strain.

A linear expansion coefficient measurement method in accordance with a second aspect of the invention is a linear expansion coefficient measurement method that finds a relationship between temperature of a measurement object and a linear expansion coefficient, by using the strain measurement apparatus of the foregoing first aspect of the invention, the method including: uniformly heating a test piece that is made of a material identical to the material for the measurement object and on which marks are formed at at least two positions, to a pre-set temperature, and disposing the test piece at a position substantially identical to the position of the measurement object; finding a distance between two marks of the marks formed on the test piece, by using at least one of the first stereo image and the second stereo image; and finding a linear expansion coefficient from the found distance between the two marks.

According to the linear expansion coefficient measurement method having the foregoing configuration, the test piece that is made of the same material as the measurement object and that is provided with marks formed at at least two positions is uniformly heated to a pre-set temperature, and is disposed at substantially the same position as that of the measurement object. Then, the distance between two of the marks formed on the test piece is found, and the linear expansion coefficient is found from the found distance between the two marks. Therefore, by using the above-described strain measurement apparatus, a relationship between the temperature of the measurement object and the linear expansion coefficient of the measurement object can easily be found (see FIGS. 7 to 9).

A correction coefficient measurement method for a temperature distribution detector in accordance with a third aspect of the invention is a correction coefficient measurement method for a temperature distribution detector that finds a relationship between an inclination angle that is an angle formed between a plane orthogonal to a direction of a sight line from the temperature distribution detector to the measurement object and a surface of the measurement object and a correction coefficient of the temperature distribution detector, by using the strain measurement apparatus in accordance with the first aspect, the method including: uniformly heating a cylindrical test piece made of a material identical to the material for the measurement object to a pre-set temperature, and disposing the test piece at a position substantially identical to the position of the measurement object; detecting a temperature distribution in a surface of the test piece by the temperature distribution detector; and finding the correction coefficient from the detected temperature distribution in the surface of the test piece.

According to the correction coefficient measurement method for a temperature distribution detector that has the foregoing configuration, the cylindrical test piece made of the same material as that for the measurement object is uniformly heated to a pre-set temperature, and then is disposed at substantially the same position as that of the measurement object. Then, the temperature distribution in the surface of the test piece is detected by the temperature distribution detector, and the correction coefficient is found from the detected temperature distribution in the surface of the test piece. Therefore, a relationship between the inclination angle of the measurement object and the correction coefficient can easily be found by using the strain measurement apparatus described above (see FIGS. 10 to 12A and 12B).

A strain measurement method in accordance with a fourth aspect of the invention includes: producing a first stereo image and a second stereo image of a measurement object with the use of a stereo camera device; finding a three-dimensional configuration of the measurement object from the first stereo image and the second stereo image to find actual strain of the measurement object; detecting a temperature distribution of the measurement object with the use of a temperature distribution detector; finding free thermal strain of the measurement object from the detected temperature distribution; and finding as constraint strain of the measurement object a difference obtained by subtracting the found free thermal strain from the found actual strain.

According to the strain measurement apparatus in accordance with the first aspect of the invention, the first stereo image and the second stereo image of the measurement object are produced by the stereo camera device. Then, a three-dimensional configuration of the measurement object is found from the first stereo image and the second stereo image, and then the actual strain is found. Furthermore, the temperature distribution in the measurement object is detected by the temperature distribution detector, and the free thermal strain is found from the detected temperature distribution. Still further, the difference obtained by subtracting the found free thermal strain from the found the actual strain is found as the constraint strain. Therefore, the constraint strain can easily be measured. This effect is also obtained by the strain measurement method in accordance with the fourth aspect of the invention.

According to the linear expansion coefficient measurement method in accordance with the second aspect of the invention, the test piece that is made of the same material as that for the measurement object and that is provided with marks formed at at least two positions is uniformly heated to the pre-set temperature, and is disposed at substantially the same position as that of the measurement object. Then, the distance between two of the marks formed on the test piece is found, and the linear expansion coefficient is found from the found distance between the two marks. Therefore, a relationship between the temperature of the measurement object and the linear expansion coefficient can easily be found by using the above-described strain measurement apparatus.

According to the correction coefficient measurement method for a temperature distribution detector in accordance with the third aspect of the invention, the cylindrical test piece made of the same material as that for the measurement object is uniformly heated to the pre-set temperature, and is disposed at substantially the same position as that of the measurement object. Then, the temperature of the surface of the test piece is measured by the temperature distribution detector, and the correction coefficient is found from the measured temperature of the surface of the test piece. Therefore, a relationship between the inclination angle of the measurement object and the correction coefficient can easily be found by using the strain measurement apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a configuration diagram showing an example of a measurement method for a correction coefficient of a thermoviewer in accordance with an embodiment of the invention;

DETAILED DESCRIPTION OF EMBODIMENTS

Embodiments of the invention will be described hereinafter with reference to the drawings.

Figure 1:
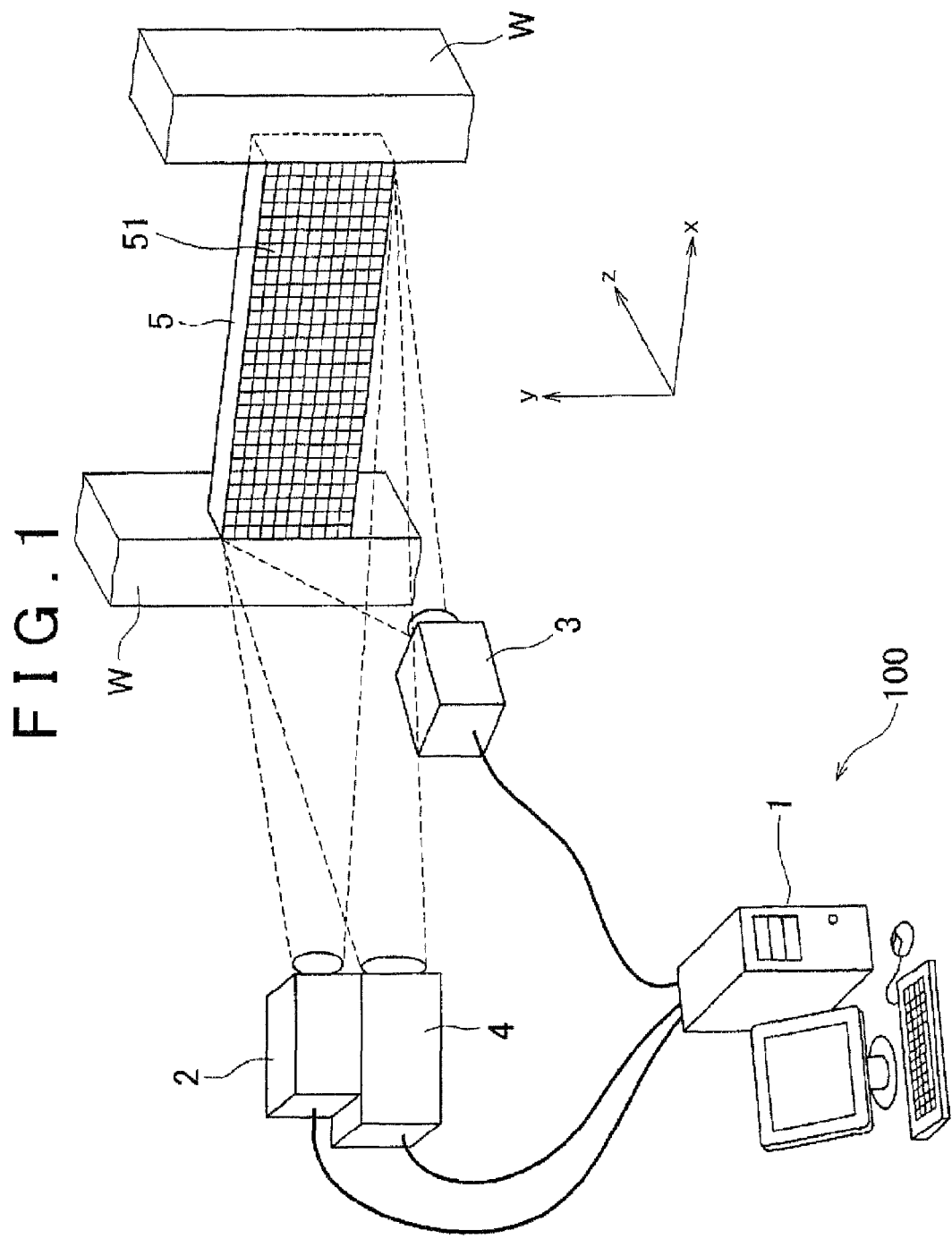
FIG. 1 is a configuration diagram showing an example of a strain measurement apparatus in accordance with an embodiment of the invention.
Figure 2A:
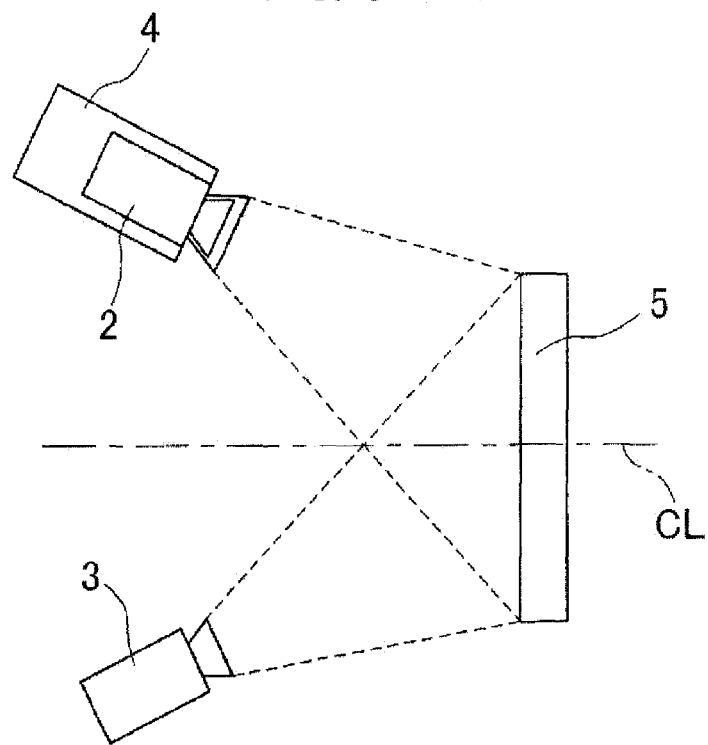
FIGS. 2A and 2B are a plan view and a side view of the strain measurement apparatus shown in FIG. 1.
Figure 2B:
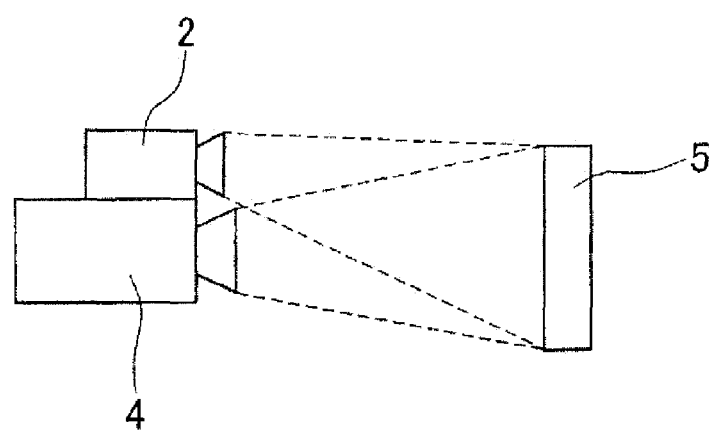

Firstly, with reference to FIGS. 1, 2A and 2B, a configuration of a strain measurement apparatus in accordance with an embodiment of the invention will be described. FIG. 1 is a configuration diagram showing an example of a strain measurement apparatus 100 in accordance with the embodiment of the invention. FIG. 2A is a plan view of the strain measurement apparatus 100 shown in FIG. 1, and FIG. 2B is a side view of the strain measurement apparatus 100 shown in FIG. 1.

The strain measurement apparatus 100 measures as a constraint strain $\epsilon r$ of a measurement object 5 a difference obtained by subtracting a free thermal strain $\epsilon t$ of the measurement object 5 that is a strain of free expansion caused by heat from an actual strain $\alpha$ that is a strain that actually occurs in the measurement object 5. As shown in FIG. 1, the strain measurement apparatus 100 includes a computer 1, a first camera 2, a second camera 3, and a thermoviewer 4, which functions as a temperature distribution detector in the invention. Furthermore, the measurement object 5 is disposed at a substantially center position of the view fields of the first camera 2, the second camera 3 and the thermoviewer 4. In this example, the measurement object 5 is a rectangular platy body whose left and right side ends are constrained in thermal expansion by walls W. Furthermore, the measurement object 5 is heated from a first temperature T1 (e.g., 20° C.) to a second temperature T2 (e.g., 900° C.) by a heat source (not shown). In this embodiment, the deformation of the measurement object 5 in the direction of a z axis is not considered (not regarded as an object to be measured) for the sake of convenience. It is to be noted that while the stereo camera device in the invention includes the first camera 2 and the second camera 3 in this embodiment, it is also possible to use a stereo camera as the stereo camera device in the invention.

Figure 3:
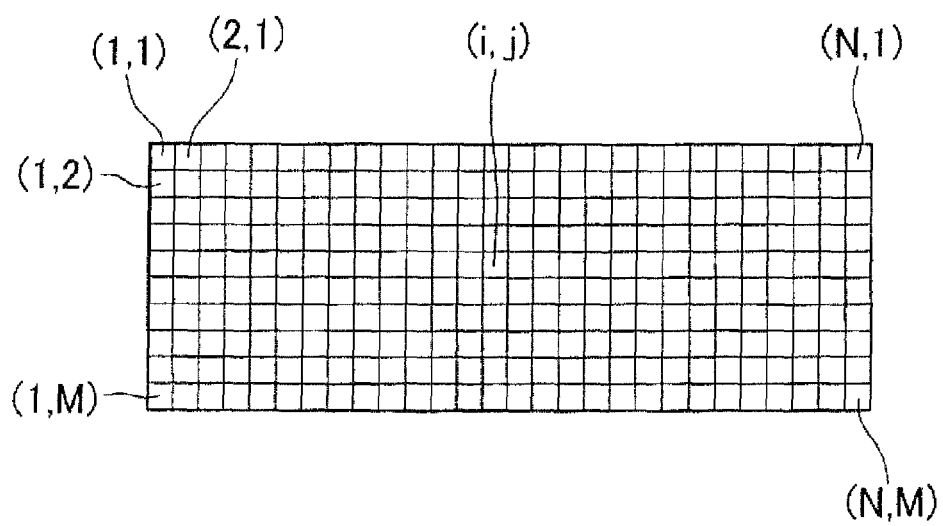
FIG. 3 shows an example of grid lines drawn on a front surface of a measurement object shown in FIG. 1.
Figure 3:
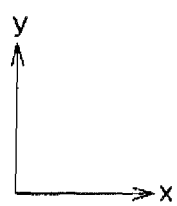

Grid lines shown in FIG. 1 are drawn on a front surface 51 of the measurement object 5 that is on a side facing the first camera 2 (and the second camera 3 and the thermoviewer 4). FIG. 3 shows an example of the grid lines drawn on the front surface 51 of the measurement object 5 shown in FIG. 1. As shown in FIG. 3, the grid lines drawn on the front surface 51 of the measurement object 5 equally divide the front surface 51 into N regions, the number of which is 50, for example, in the X direction and M regions, the number of which is 10, for example, in the Y direction. In this example, each lattice point is represented by (i, j). The letter i of (i, j) represents the number of a lattice in the X direction, with i=1 representing the left end lattice and i=N representing the right end lattice. Likewise, the letter j represents the number of a lattice in the Y direction, with j=1 representing the upper end lattice and j=M representing the lower end lattice. In the following description, the temperature of the front surface 51 corresponding to the lattice point (i, j) is expressed as the temperature T(i, j). Furthermore, the actual strain $\epsilon c$, the free thermal strain $\epsilon t$ and the constraint strain $\epsilon r$ of the front surface 51 corresponding to the lattice point (i, j) are expressed as the actual strain $\epsilon c(i, j)$, the free thermal strain $\epsilon t(i, j)$ and the constraint strain $\epsilon r(i, j)$, respectively. It is to be noted herein that the letter i is an integer from 1 to N and the letter j is an integer from 1 to M.

The computer 1 includes what is called a personal computer or the like, and controls operations of the entire strain measurement apparatus 100, and includes a central processing unit (CPU), a read-only memory (ROM), a random access memory (RAM), etc. The ROM stores various control programs and the like. The CPU reads various control programs stored in the ROM, and executes various processes according to the programs. The RAM is a memory for temporarily storing results of computations performed by the CPU and the like.

Furthermore, the computer 1 includes a manipulation input portion, a display portion, a hard disk drive (HDD), etc. The manipulation input portion accepts manipulations from outside, and includes a keyboard, a mouse, etc. The display portion includes a liquid crystal display (LCD) or the like, and displays results of computations of the CPU and the like so that the results and the like are visually recognizable from outside. The HDD stores various data.

The first camera 2 is placed on top of the thermoviewer 4 as shown in FIG. 2B, and produces a first stereo image PS1 of the measurement object 5. The first stereo image PS1 produced by the first camera 2 is output to the computer 1 (an image acquisition portion 11 shown in FIG. 4). Incidentally, the first stereo image PS1 is an image that is used as a reference for finding the actual strain $\epsilon c(i, j)$ via an actual strain calculation portion 12 described later.

The second camera 3 is disposed at a position apart from the first camera 2, and produces a second stereo image PS2 of the measurement object 5. The second stereo image PS2 produced by the second camera 3 is output to the computer 1 (the image acquisition portion 11 shown in FIG. 4). As shown in FIG. 2A, the second camera 3 is disposed at a position that is line symmetric to the position of the first camera 2 with respect to a center line CL of the measurement object 5.

The thermoviewer 4 is disposed under the first camera 2, and detects the temperature distribution on the measurement object 5. The information that shows the temperature distribution detected by the thermoviewer 4 is output to the computer 1 (a temperature acquisition portion 13 shown in FIG. 4).

Since the first camera 2 that produces the first stereo image PS1 that is used as a reference for finding the actual strain $\epsilon c(i, j)$ is placed on the upper side of the thermoviewer 4, the "constraint strain $\epsilon r(i, j)$" can be more easily measured.

That is, since the actual strain $\epsilon c(i, j)$ is measured by using as a reference the first camera 2 disposed adjacent to the thermoviewer 4, the positional alignment of the lattice point (i, j), at which the actual strain $\epsilon c(i, j)$ is to be found, and the lattice point (i, j), at which the free thermal strain $\epsilon t(i, j)$ is to be found, can easily be carried out, so that the constraint strain $\epsilon r(i, j)$ can more easily be measured.

Although this embodiment will be described in conjunction with the case where the first camera 2 is placed on the upper side of the thermoviewer 4, it suffices that the first camera 2 or the second camera 3 is disposed near the thermoviewer 4. For example, an arrangement in which the second camera 3 is disposed just beside the thermoviewer 4. In this arrangement, a second stereo image PS2 produced by the second camera 3 is used as an image that serves as a reference at the time of finding the actual strain $\epsilon c(i, j)$ via the actual strain calculation portion 12 (described later).

Figure 4:
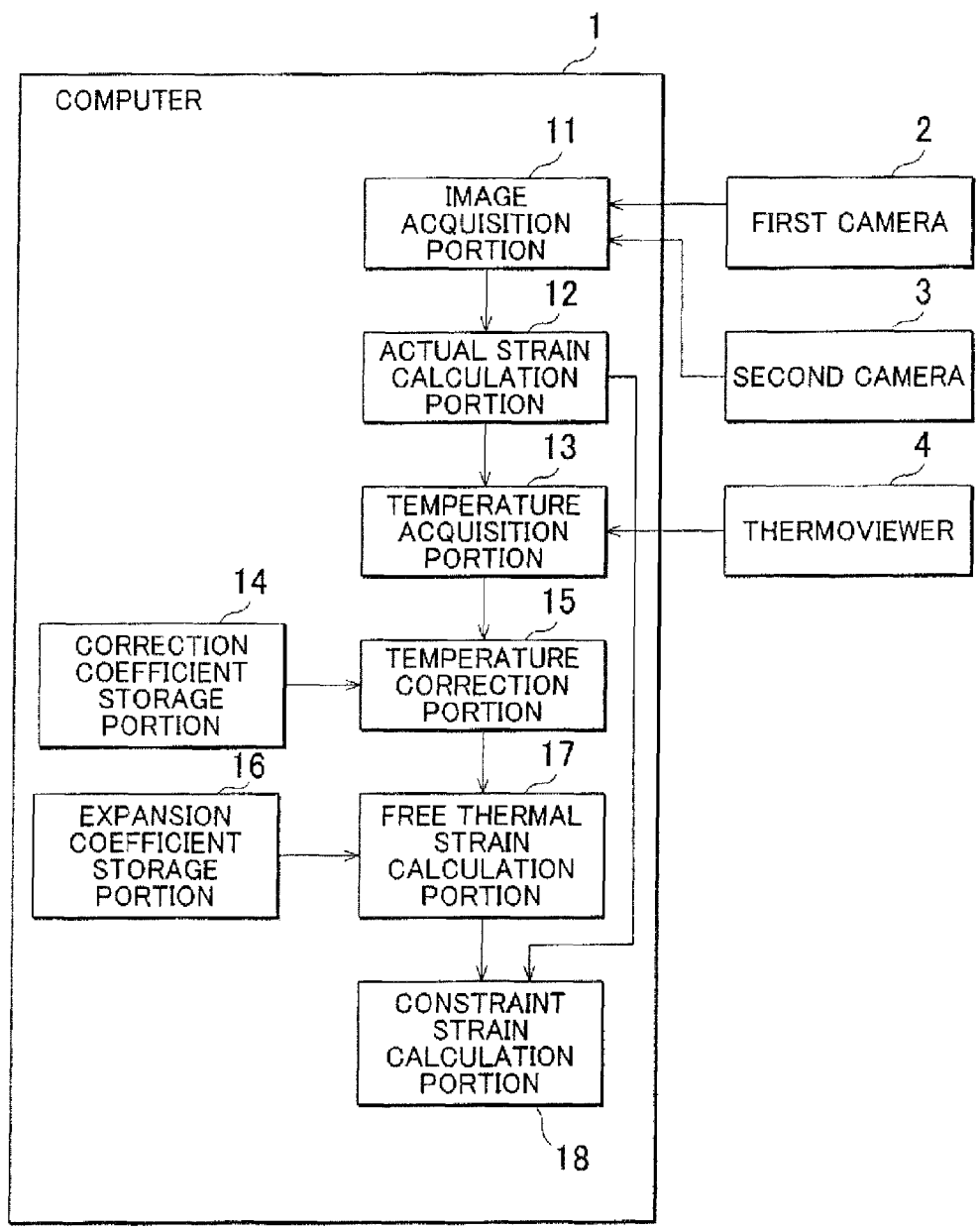
FIG. 4 is a functional configuration diagram showing an example of a functional configuration of a computer shown in FIG. 1.

Next, a configuration of the computer 1 will be described with reference to FIG. 4. FIG. 4 is a functional configuration diagram showing an example of a functional configuration of the computer 1. By reading and executing control programs stored in the ROM or the like, the computer 1 functions as various function portions, including the image acquisition portion 11, the actual strain calculation portion 12, the temperature acquisition portion 13, a correction coefficient storage portion 14, a temperature correction portion 15, an expansion coefficient storage portion 16, a free thermal strain calculation portion 17, a constraint strain calculation portion 18, etc. It is to be noted herein that the actual strain calculation portion 12, the correction coefficient storage portion 14, the temperature correction portion 15, the expansion coefficient storage portion 16, the free thermal strain calculation portion 17 and the constraint strain calculation portion 18 correspond to portions of the strain measurement apparatus 100 in accordance with the invention.

The image acquisition portion 11 is a function portion that acquires first stereo images PS1 produced by the first camera 2 and second stereo images PS2 produced by the second camera 3.

The actual strain calculation portion 12 is a function portion that finds the actual strain $\epsilon c(i, j)$ in the front surface 51 of the measurement object 5 on the basis of first stereo images PS1 and second stereo images PS2 that are acquired by the image acquisition portion 11. The actual strain calculation portion 12 functions as an "actual strain calculation portion" recited in the appended claims.

Specifically, on the basis of first stereo images PS1 and second stereo images PS2 acquired by the image acquisition portion 11, the actual strain calculation portion 12 finds the x-y coordinates (x1$ij$, y1$ij$) and (x2$ij$, y2$ij$) of the center position of each lattice point (i, j) in the front surface 51 of the measurement object 5 at the first temperature T1 (e.g., 20° C.) and the second temperature T2 (e.g., 900° C.), respectively. The letter i is an integer from 1 to N, and the letter j is an integer from 1 to M. A method for finding the x-y coordinates of the center position of each lattice point (i, j) on the basis of two stereo images is available (see "Image Correlation for Deformation and Shape Measurements: Basic Concepts, Theory and Applications", Chapter 4: Two-Dimensional and Three-Dimensional Computer Vision, P65-P80, author: Sutton. M. A., Orteu. J., published April 2009, publisher: Springer, ISBN: 9780387787466, and Japanese Patent Application Publication No. 2009-270915 (JP 2009-270915 A), and Japanese Patent Application Publication No. 2001-241928 (JP 2001-241928 A)). Thus, detailed description of such a method is omitted.

Next, from the coordinates (x1$ij$, y1$ij$) and (x2$ij$, y2$ij$) of the center position of each lattice point (i, j) in the front surface 51 of the measurement object 5 at the first temperature T1 and the second temperature T2, the actual strain calculation portion 12 finds the actual strain $\epsilon c(i, j)$ at each lattice point (i, j) as an actual strain $\epsilon cx(i, j)$ in a width direction (x direction) and an actual strain $\epsilon cy(i, j)$ in a height direction (y direction). The actual strain $\epsilon cx(i, j)$ in the width direction is found using, for example, expressions (1) to (4) below.

$$\epsilon cx(i, j) = \Delta Lx(i, j)/L1x(i, j) \quad (1)$$

$$\Delta Lx(i, j) = L2x(i, j) - L1x(i, j) \quad (2)$$

$$L1x(i, j) = ((x1ij - x1(i-1)j)^2 + (y1ij - y1(i-1)j)^2)^{1/2} \quad (3)$$

$$L2x(i, j) = ((x2ij - x2(i-1)j)^2 + (y2ij + y2(i-1)j)^2)^{1/2} \quad (4)$$

The actual strain $\epsilon cy(i, j)$ in the height direction can be found using, for example, expressions (5) to (8) below.

$$\epsilon cy(i, j) = \Delta Ly(i, j)/L1y(i, j) \quad (5)$$

$$\Delta Ly(i, j) = L2y(i, j) - L1y(i, j) \quad (6)$$

$$L1y(i, j) = ((x1ij - x1i(j-1))^2 + (y1ij - y1i(j-1))^2)^{1/2} \quad (7)$$

$$L2y(i, j) = ((x2ij - x2i(j-1))^2 + (y2ij - y2i(j-1))^2)^{1/2} \quad (8)$$

That is, the actual strain $\epsilon c(i, j)$ of each lattice point (i, j) is found on the basis of a change (L1→L2) in the distance between the center position of the lattice point (i, j) and the center position of an adjacent lattice point that occurs with the change from the first temperature T1 to the second temperature T2 (i.e., the change (L1→L2) from the distance L1 at the first temperature T1 to the distance L2 at the second temperature T2).

More specifically, the actual strain $\epsilon cx(i, j)$ of each lattice point (i, j) in the width direction is found on the basis of the change (L1$x$→L2$x$) in the distance from the center position of the lattice point (i, j) to the center position of the lattice point adjacent to the left side of the lattice point (i, j) that occurs when the temperature changes from the first temperature T1 to the second temperature T2. The actual strain $\epsilon cy(i, j)$ of each lattice point (i, j) in the height direction is found on the basis of the change (L1$y$→L2$y$) in the distance from the center position of the lattice point (i, j) to the center position of the lattice point adjacent to the upper side of the lattice point (i, j) that occurs when the temperature changes from the first temperature T1 to the second temperature T2. In the following description, the actual strain $\epsilon cx(i, j)$ in the width direction and the actual strain $\epsilon cy(i, j)$ in the height direction will be collectively termed the actual strain $\epsilon c(i, j)$ for the sake of convenience.

The temperature acquisition portion 13 is a function portion that acquires temperature distribution information that is detected by the thermoviewer 4. Furthermore, the temperature acquisition portion 13, on the basis of the acquired temperature distribution information, finds the temperature Tij at each of the positions that correspond to the lattice points (i, j) in the front surface 51 of the measurement object 5.

The correction coefficient storage portion 14 is a function portion that stores correction coefficients $\beta(\theta)$ (see FIG. 9) for correcting the temperatures that are included in a temperature distribution detected by the thermoviewer 4 in such a manner of storage that the correction coefficients $\beta(\theta)$ correspond to the inclination angle $\theta$ that is the angle formed between a plane orthogonal to the direction of the sight line extending from the thermoviewer 4 to the measurement object 5 and the surface of the measurement object 5. Herein, the correction coefficient storage portion 14 functions as a "correction coefficient storage portion" recited in the appended claims.

Specifically, the correction coefficient storage portion 14 stores the correction coefficients $\beta(\theta)$ in association with the inclination angles $\theta$ in the form of a map or a lookup table (LUT) in the ROM or the like. In the embodiment, it is assumed that the correction coefficients $\beta(\theta)$ of the thermoviewer 4 are found by a correction coefficient measurement method (described later with reference to FIGS. 10 to 12) of measuring the correction coefficient of the thermoviewer 4 in accordance with the invention, and are stored in the correction coefficient storage portion 14.

The temperature correction portion 15 is a function portion that finds an inclination angle $\theta$ from the three-dimensional configuration of the measurement object 5 found by the actual strain calculation portion 12, and that reads the correction coefficient β(θ) corresponding to the found inclination angle θ from the correction coefficient storage portion 14, and that uses the read correction coefficient β(θ) to correct the temperature distribution detected by the thermoviewer 4. The temperature correction portion 15 functions as a "temperature correction portion" recited in the appended claims.

Specifically, the temperature correction portion 15 finds a post-correction temperature TA(i, j) by correcting the temperature TS(i, j) of each lattice point (i, j) detected by the thermoviewer 4, by using the following expression (9).

$$TA(i, j) = TS(i, j)/β(i, j) \quad (9)$$

where β(i, j) is a correction coefficient that corresponds to the inclination angle of each lattice point (i, j).

However, in the embodiment, since the deformation of the measurement object 5 in the z direction is not considered (not regarded as a measurement object) for the sake of convenience as mentioned above, correction is performed with the inclination angle θ assumed to be "0".

Thus, the correction coefficients β(θ) for correcting the temperatures TS(i, j) included in the temperature distribution T detected by the thermoviewer 4 are stored in the correction coefficient storage portion 14 in association with the inclination angle between a plane orthogonal to the direction of a sight line from the thermoviewer 4 toward the measurement object 5 and the surface of the measurement object 5. The inclination angle θ is found from the three-dimensional configuration of the measurement object 5 by the temperature correction portion 15. Then, the correction coefficient β(θ) (see FIG. 12) that corresponds to the found inclination angle θ is read from the correction coefficient storage portion 14, and the temperature TS(i, j) detected by the thermoviewer 4 is corrected by using the read correction coefficient β(θ). Then, the free thermal strain εt(i, j) is found from the corrected temperature TA(i, j). Therefore, the free thermal strain εt(i, j) can be accurately and easily found.

The expansion coefficient storage portion 16 is a function portion that stores the linear expansion coefficient α of the measurement object 5 and the temperature T of the measurement object 5 in association with each other. The expansion coefficient storage portion 16 functions as an "expansion coefficient storage portion" recited in the appended claims.

Specifically, the expansion coefficient storage portion 16 stores the linear expansion coefficient α(T) in the ROM or the like in association with the temperature T in the form of a map or a lookup table (LUT). Furthermore, in the embodiment, the linear expansion coefficient α(T) is found by a linear expansion coefficient measurement method in accordance with the invention (described later with FIGS. 7 to 9), and is stored in the expansion coefficient storage portion 16.

The free thermal strain calculation portion 17 is a function portion that finds a free thermal strain εt from the temperature distribution in the measurement object 5 detected by the thermoviewer 4. The free thermal strain calculation portion 17 functions as a "free thermal strain calculation portion" recited in the appended claims.

Specifically, the free thermal strain calculation portion 17 reads linear expansion coefficients α(T(i, j)) that correspond to the temperatures T(i, j) of the lattice points (i, j) included in the temperature distribution detected by the thermoviewer 4 from the expansion coefficient storage portion 16, and finds the free thermal strain εt(i, j) of each lattice point (i, j) as a free thermal strain εtx(i, j) in the width direction and a free thermal strain εty(i, j) in the height direction by using the following expressions (10) and (11).

$$εtx(i, j) = (α(T(i, j)) - α0) \times L1x(i, j) \quad (10)$$

$$εty(i, j) = (α(T(i, j)) - α0) \times L1y(i, j) \quad (11)$$

where α0 is the value of the linear expansion coefficient α at the first temperature T1, which is the initial temperature of the measurement object 5.

Furthermore, L1x(i, j) in the expression (10) and L1y(i, j) in the expression (11) are the inter-lattice distance in the width direction and the inter-lattice distance in the height direction of the measurement object 5 at the first temperature T1 that are given by the aforementioned expressions (3) and (7), respectively. In the description below, the free thermal strain εtx(i, j) in the width direction and the free thermal strain εty(i, j) in the height direction will be collectively termed the free thermal strain εt(i, j) for the sake of convenience.

As described above, the linear expansion coefficient α(T) of the measurement object 5 and the temperature T of the measurement object 5 are stored in association with each other in the expansion coefficient storage portion 16, and a linear expansion coefficient α(T(i, j)) (see FIG. 9) is read from the expansion coefficient storage portion 16, corresponding to each of the temperatures T(i, j) included in the temperature distribution detected by the thermoviewer 4, so as to find the free thermal strain εt(i, j) of each lattice point (i, j). Therefore, the free thermal strain εt(i, j) can easily be found.

The constraint strain calculation portion 18 is a function portion that finds as the constraint strain εr(i, j) a difference obtained by subtracting the free thermal strain εt(i, j) found by the free thermal strain calculation portion 17 from the actual strain εc(i, j) found by the actual strain calculation portion 12. The constraint strain calculation portion 18 functions as a "constraint strain calculation portion" recited in the appended claims.

That is, the constraint strain calculation portion 18 finds the constraint strain εr(i, j) of each lattice point (i, j) by the following expression (12).

$$εr(i, j) = εc(i, j) - εt(i, j) \quad (12)$$

Figure 5:
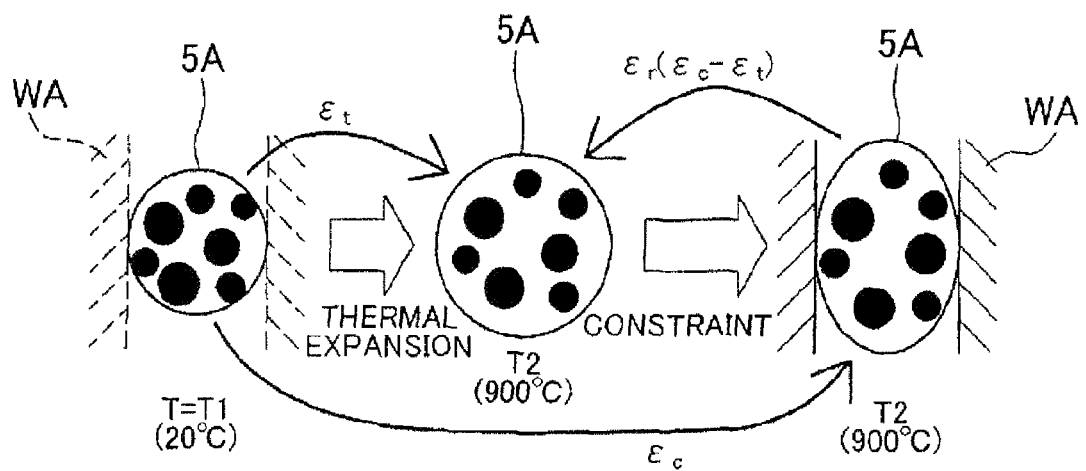
FIG. 5 is a conceptual diagram showing a concept of "constraint strain" in accordance with the invention.

The constraint strain εr will be described with reference to FIG. 5. FIG. 5 is a conceptual diagram showing a concept of the "constraint strain" in accordance with the invention. A disc-shaped measurement object 5A is heated from the first temperature TI (e.g., 20° C.) to the second temperature T2 (e.g., 900° C.) and therefore thermally expands, with left and right side ends of the measurement object 5A constrained from movement by walls WA. In this case, as the temperature increases, the measurement object 5A thermally expands. However, since the left and right side ends are constrained from movement by the walls WA, the measurement object 5A comes to have a shape of an elongated circle (or an ellipse) that is long in a vertical direction when heated to the second temperature T2, as shown in a right side portion of FIG. 5.

In the strain measurement apparatus 100 in accordance with the invention, a state in which the measurement object 5A has freely expanded at the second temperature T2 as shown in a central portion of FIG. 5 is assumed between an initial state as shown in a left side portion of the FIG. 5 and the post-heating state as shown in the right side portion of FIG. 5. Then, the constraint strain εr is defined as a difference between the actual strain εc, which is the strain that occurs in the state shown in the right end portion of FIG. 5, and the free thermal strain εt, which occurs in the state shown in the central portion of FIG. 5. The thus-defined constraint strain εr is used as information related to the stress that occurs in the measurement object 5A. In other words, this invention is intended to estimate, using the constraint strain εr, the aforementioned stress that is caused by the repeated heating and cooling of the measurement object 5A and that affects the service life of the measurement object 5A.

Figure 6:
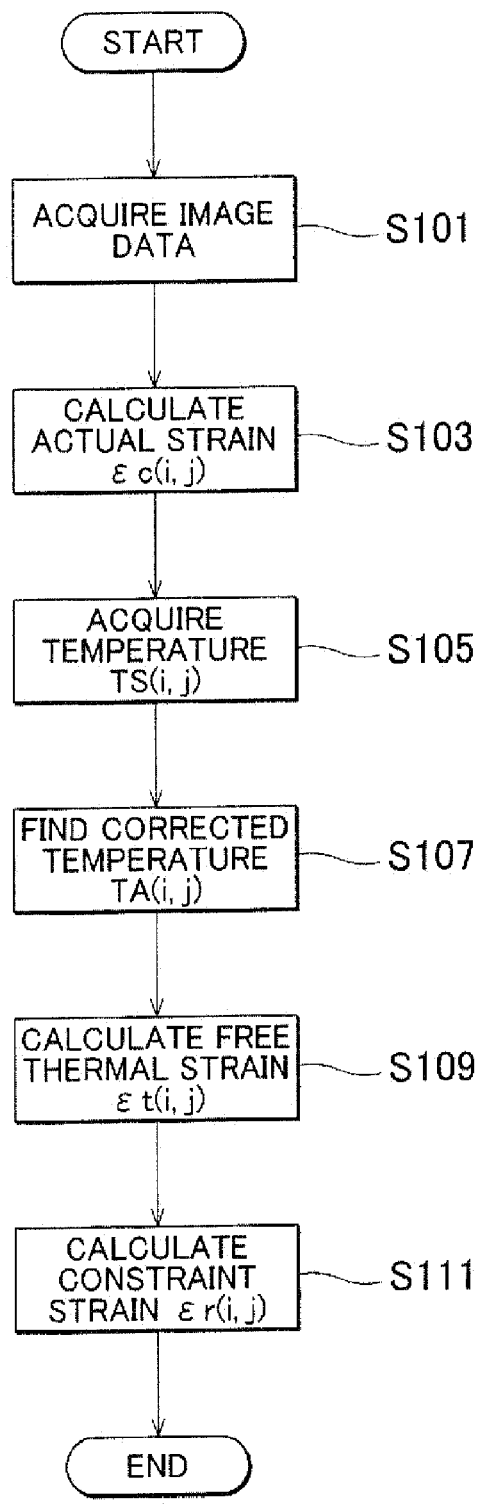
FIG. 6 is a flowchart showing an example of an operation of the strain measurement apparatus shown in FIG. 4.

Next, the strain measurement apparatus 100 (mainly, the computer 1) in accordance with the invention will be described with reference to FIG. 6. FIG. 6 is a flowchart showing an example of an operation of the strain measurement apparatus 100 shown in FIG. 4. Firstly, a first stereo image PS1 and a second stereo image PS2 are acquired from the first camera 2 and the second camera 3, respectively, by the image acquisition portion 11 (step S101). Then, on the basis of the first stereo image PS1 and the second stereo image PS2 acquired in the step S101, the actual strain $\epsilon e(i, j)$ in the front surface 51 of the measurement object 5 is found by the actual strain calculation portion 12 (step S103).

Subsequently, the temperature TSij at a position that corresponds to the lattice point (i, j) detected by the thermoviewer 4 is acquired by the temperature acquisition portion 13 (step S105). Next, the temperature $TS(i, j)$ of the lattice point (i, j) is corrected by the temperature correction portion 15 to find a post-correction temperature $TA(i, j)$ (step S107). Then, the free thermal strain $\epsilon t(i, j)$ is found by the free thermal strain calculation portion 17 on the basis of the temperature $TA(i, j)$ corrected in the step S107 (step S109). Next, the constraint strain $\epsilon r(i, j)$ is found by the constraint strain calculation portion 18 as a difference obtained by subtracting the free thermal strain $\epsilon t(i, j)$ found in step S109 from the actual strain $\epsilon c(i, j)$ found in step S103 (step S111). After that, the process ends.

As described above, the first stereo image PS1 of the measurement object 5 is produced by the first camera 2. Furthermore, a second stereo image PS2 of the measurement object 5 is produced by the second camera 3 disposed at a position apart from the first camera 2. Then, a three-dimensional configuration of the measurement object 5 is found from the first stereo image PS1 and the second stereo image PS2, and the actual strain $\epsilon c(i, j)$ is found. Besides, the temperature distribution Tij of the measurement object 5 is detected by the thermoviewer 4, and the free thermal strain $\epsilon t(i, j)$ is found from the detected temperature distribution Tij. Furthermore, the difference obtained by subtracting the found free thermal strain $\epsilon t(i, j)$ from the found actual strain $\epsilon c(i, j)$ is found as the constraint strain $\epsilon r(i, j)$. Therefore, the constraint strain $\epsilon r(i, j)$ can easily be measured.

That is, in the strain measurement apparatus 100 in accordance with the invention, the difference obtained by subtracting the free thermal strain $\epsilon t(i, j)$, which is the strain of the measurement object 5 resulting from free expansion caused by heat, from the actual strain $\epsilon c(i, j)$, which is the actual strain of the measurement object 5, is defined as the "constraint strain $\epsilon r(i, j)$" and this "constraint strain $\epsilon r(i, j)$" is measured as an index for evaluating the service life length of the measurement object 5 affected by thermal fatigue. Then, the apparatus 100 finds the actual strain $\epsilon c(i, j)$ from the first stereo image PS1 and the second stereo image PS2 produced by the first camera 2 and the second camera 3, respectively, and finds the free thermal strain $\epsilon t(i, j)$ from the temperature distribution Tij of the measurement object 5 detected by the thermoviewer 4. Therefore, the strain measurement apparatus 100 can easily measure the "constraint strain $\epsilon r(i, j)$", which is the difference obtained by subtracting the free thermal strain $\epsilon t(i, j)$ from the actual strain $\epsilon c(i, j)$.

Figure 7:
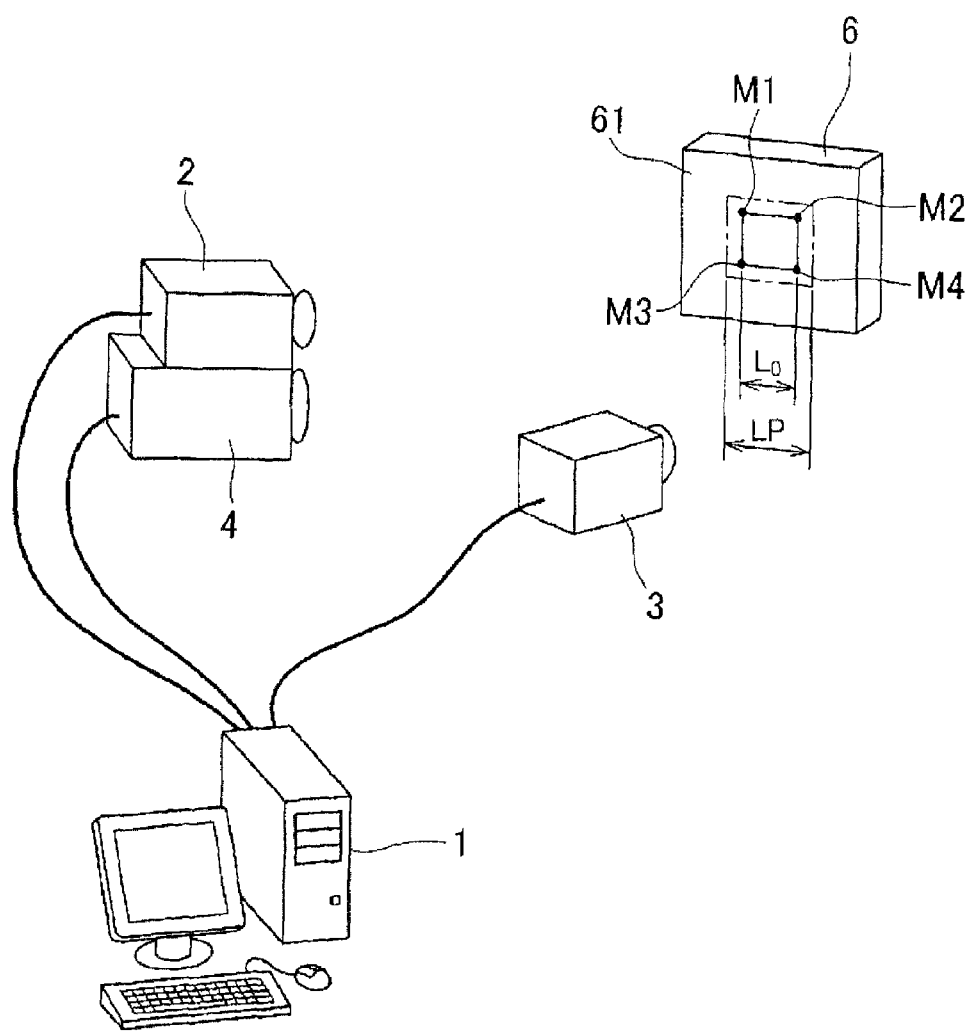
FIG. 7 is a configuration diagram showing an example of a linear expansion coefficient measurement method in accordance with an embodiment of the invention.
Figure 8:
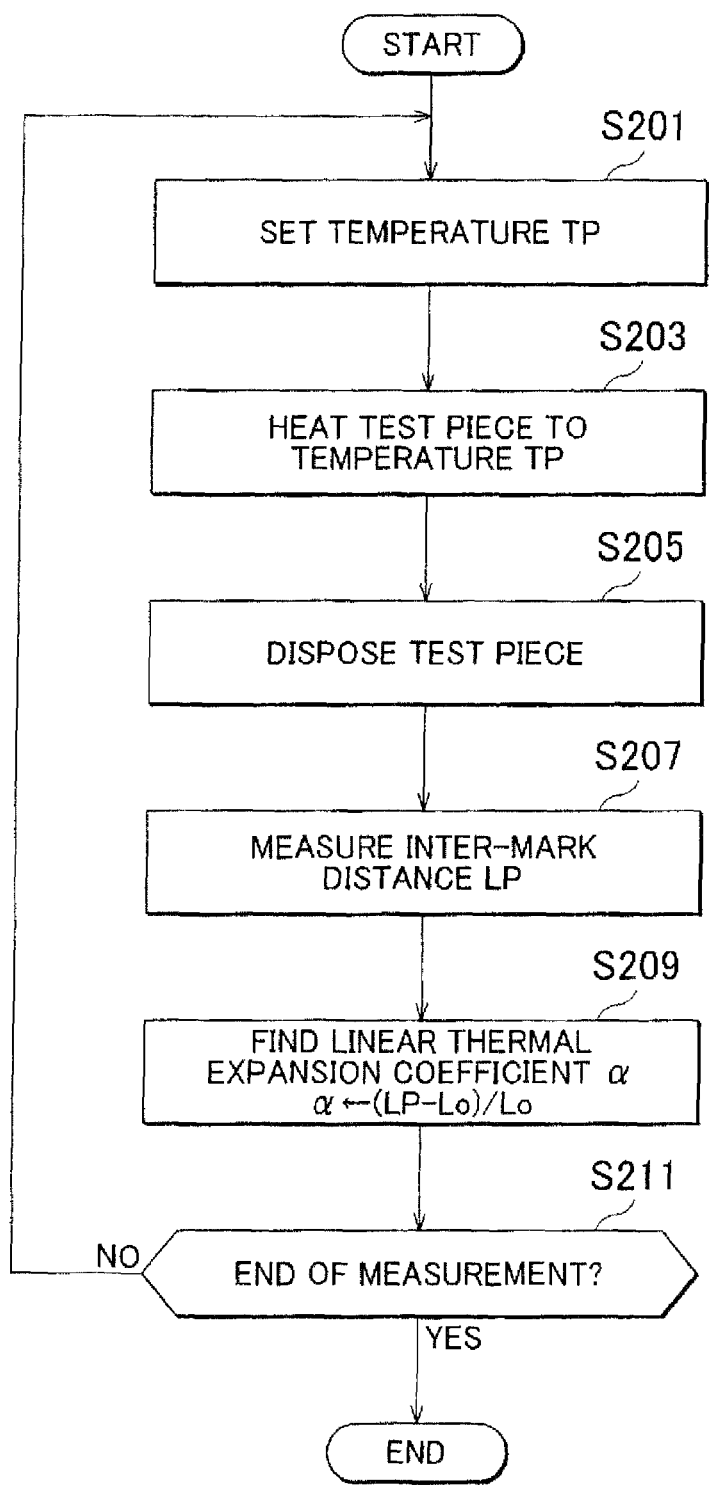
FIG. 8 is a flowchart showing an example of a processing procedure of the linear expansion coefficient measurement method in accordance with the embodiment of the invention.

Next, a linear expansion coefficient measurement method in accordance with the invention will be described with reference to FIGS. 7 to 9. FIG. 7 is a configuration diagram showing an example of the linear expansion coefficient measurement method in accordance with the invention. As shown in FIG. 7, the linear expansion coefficient measurement method in accordance with the invention finds a relationship between the temperature T and the linear expansion coefficient $\epsilon t(T)$ by using the above-described strain measurement apparatus 100. Instead of the measurement object 5 shown in FIG. 1, a test piece 6 is disposed as shown in FIG. 7 at substantially the same position as the measurement object 5 shown in FIG. 1.

The test piece 6 is made of the same material as that for the measurement object 5, and a front surface 61 of the test piece 6 is provided with four marks M1 to M4. The marks MI to M4 are drawn or formed at positions that correspond to the four vertexes of a square. The length of each side of the square is L0 at an initial temperature T0 (e.g., 20° C.). The test piece 6 is uniformly heated to pre-set temperatures TP (e.g., temperatures selected at intervals of 10° C. from the first temperature T1=20° C. to the second temperature T2=900° C.), and is disposed at substantially the same position as that of the measurement object 5 shown in FIG. 1.

The distance LP between two of the marks formed on the front surface 61 of the test piece 6 (between the mark M3 and the mark M4 in this case) is found by the first camera 2. The distance LP is found every time a new temperature TP is set (e.g., every time one of the temperatures selected at intervals of 10° C. from the first temperature T1=20° C. to the second temperature T2=900° C. is set). Then, from the found distance LP between the two marks, the linear expansion coefficient $\alpha$ is found by an expression (13) shown below.

$$\alpha = (LP - L0)/L0 \quad (13)$$

Next, a procedure of the linear expansion coefficient measurement method in accordance with the invention will be described with reference to FIG. 8. FIG. 8 is a flowchart showing an example of a processing procedure of the linear expansion coefficient measurement method in accordance with the invention. Firstly, a temperature TP to which the test piece 6 is to be heated is set (step S201). Then, the test piece 6 is uniformly heated to the temperature TP set in step S201 (step S203).

Subsequently, the test piece 6 uniformly heated to the temperature TP in step S203 is disposed at substantially the same position as that of the measurement object 5 shown in FIG. 1 (step S205). Next, the distance LP between two of the marks on the test piece (in this case, the distance between the mark M3 and the mark M4) is found (step S207). Then, the linear expansion coefficient $\alpha$ is found by the foregoing expression (13) (step S209). Next, it is determined whether to end the measurement (step S211). As for this determination, it is determined that the measurement is to be ended when the measurement of the linear expansion coefficient $\alpha$ has been completed for all the set temperatures, for example, the temperatures selected at intervals of 10° C. in the range of 20° C. to 900° C. If the answer to the determination in step S211 is YES, the process ends. If the answer to the determination in step S211 is NO, the process returns to step S201, and the process starting at step S201 is repeated.

Figure 9:
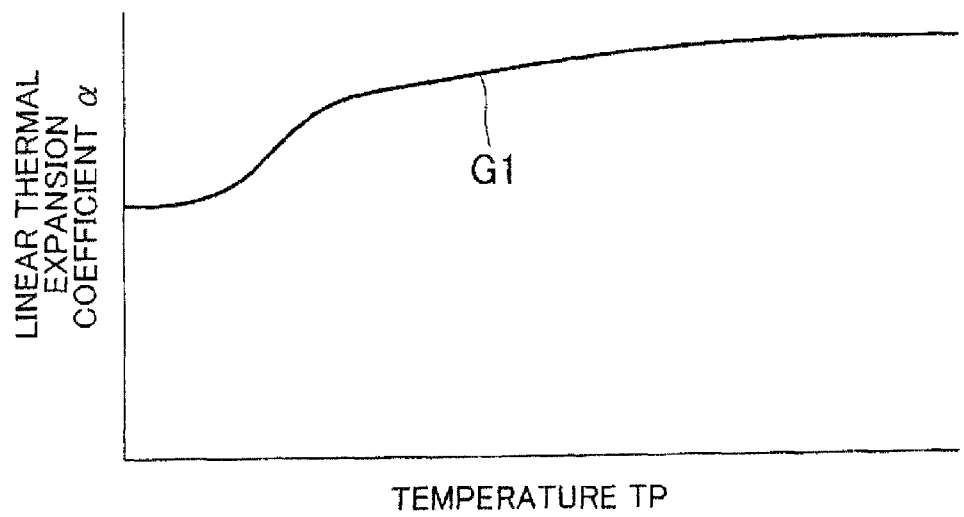
FIG. 9 is a graph showing an example of results of measurement of a linear expansion coefficient.

FIG. 9 is a graph G1 showing an example of results of measurement of the linear expansion coefficient $\alpha$. In the graph, the horizontal axis represents the temperature TP of the test piece 6 (or of the measurement object 5), and the vertical axis represents the linear expansion coefficient $\alpha$.

In the manner as described above, the test piece 6 that is made of the same material as that for the measurement object 5 and that is provided with marks formed at at least two positions is uniformly heated to the pre-set temperature TP, and is disposed at substantially the same position as that of the measurement object 5. Then, the distance LP between the two marks M3 and M4 on the test piece 6 is found, and the linear expansion coefficient $\alpha$ is found form the found distance LP between the marks M3 and M4. Therefore, using the above-described strain measurement apparatus 100, a relationship between the temperature TP of the measurement object 5 and the linear expansion coefficient α of the measurement object 5 can easily be found.

Although the description of this embodiment has been made in the case where the distance LP is found by using the first camera 2, it suffices that the distance LP is found by using at least one of the first camera 2 and the second camera 3.

Figure 11:
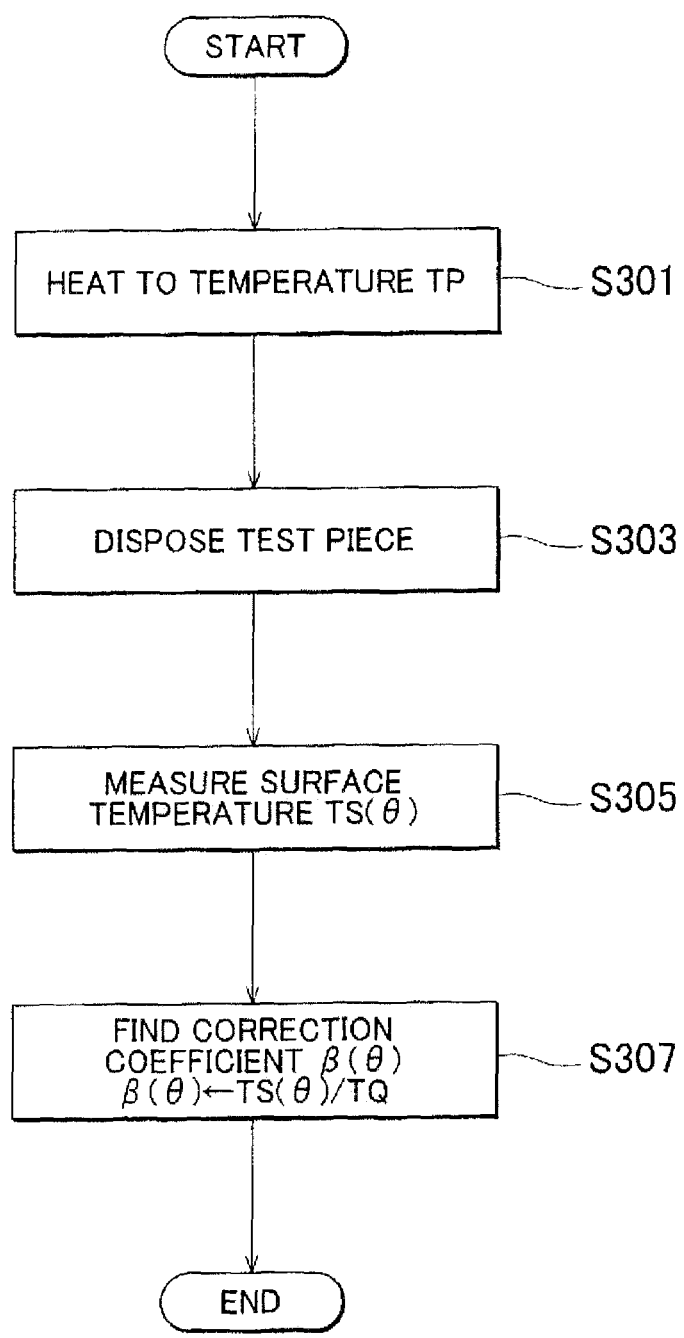
FIG. 11 is a flowchart showing an example of a processing procedure of the correction coefficient measurement method for a thermoviewer in accordance with the embodiment of the invention.

Next, a measurement method of the correction coefficient β(θ) of the thermoviewer 4 in accordance with the invention will be described with reference to FIGS. 10 to 12. FIG. 10 is a configuration diagram showing an example of the measurement method for the correction coefficient β(θ) of the thermoviewer 4 in accordance with the invention. As shown in FIG. 10, the measurement method for the correction coefficient β(θ) of the thermoviewer 4 in accordance with the invention finds a relationship between the correction coefficient β(θ) and the inclination angle θ that is the angle formed between a plane orthogonal to the direction of the sight line from the thermoviewer 4 to the measurement object 5 and the surface of the measurement object 5, by using the above-described strain measurement apparatus 100. Instead of the measurement object 5 shown in FIG. 1, a test piece 7 is disposed as shown in FIG. 10 at substantially the same position as that of the measurement object 5 shown in FIG. 1.

The test piece 7 is made of the same material as that for the measurement object 5, and is formed in a cylindrical shape. The test piece 7 is uniformly heated to a pre-set temperature TQ (e.g., 600° C.), and is disposed at substantially the same position as that of the measurement object 5 shown in FIG. 1.

Next, a distribution of the temperature TS(θ) in the surface of the test piece 7 is detected by the thermoviewer 4. It is to be noted herein that the inclination angle θ is the angle formed between a plane orthogonal to the direction of the sight line from the thermoviewer 4 to the measurement object 5 and the surface of the test piece 7. Then, from the detected distribution of the temperature TS(θ), the correction coefficient β(θ) is found by an expression (14) below.

$$\beta(\theta)=TS(\theta)/TQ \quad (14)$$

Next, a processing procedure of the measurement method for the correction coefficient β(θ) of the thermoviewer 4 in accordance with the invention will be described with reference to FIG. 11. FIG. 11 is a flowchart showing an example of the processing procedure of the measurement method for the correction coefficient β(θ) of the thermoviewer 4 in accordance with the invention. Firstly, the test piece 7 is uniformly heated to the temperature TQ (step S301).

Subsequently, the test piece 7 uniformly heated to the temperature TQ in step S301 is disposed at substantially the same position as that of the measurement object 5 shown in FIG. 1 (step S303). Next, a distribution of the temperature TS(θ) in the surface of the test piece 7 is detected by the thermoviewer 4 (step S305). Then, the correction coefficient β(θ) of the thermoviewer 4 is found by using the expression (14) below (step S307). After that, the process ends.

Figure 12A:
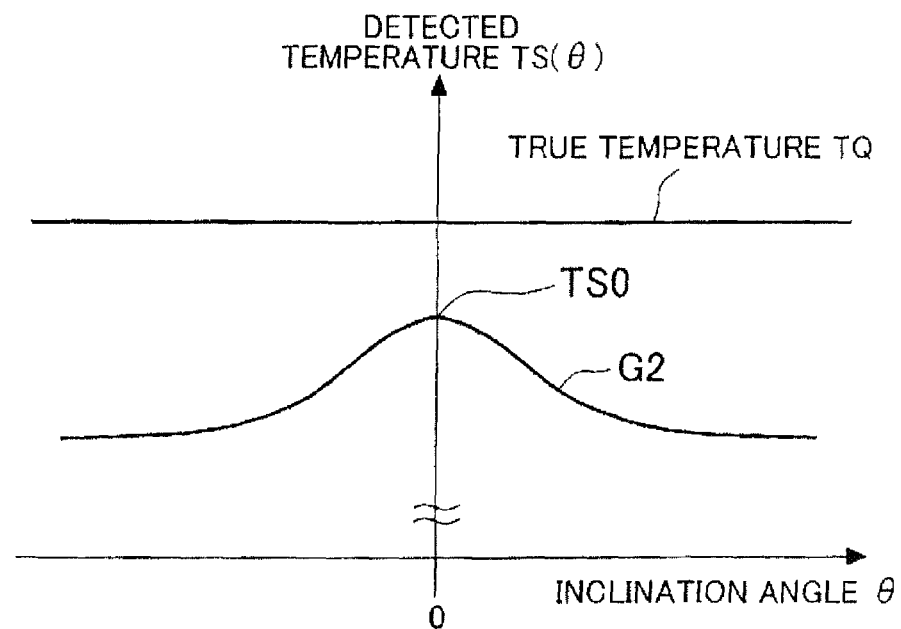
FIGS. 12A and 12B are graphs showing an example of results of measurement of the correction coefficient of the thermoviewer.
Figure 12B:
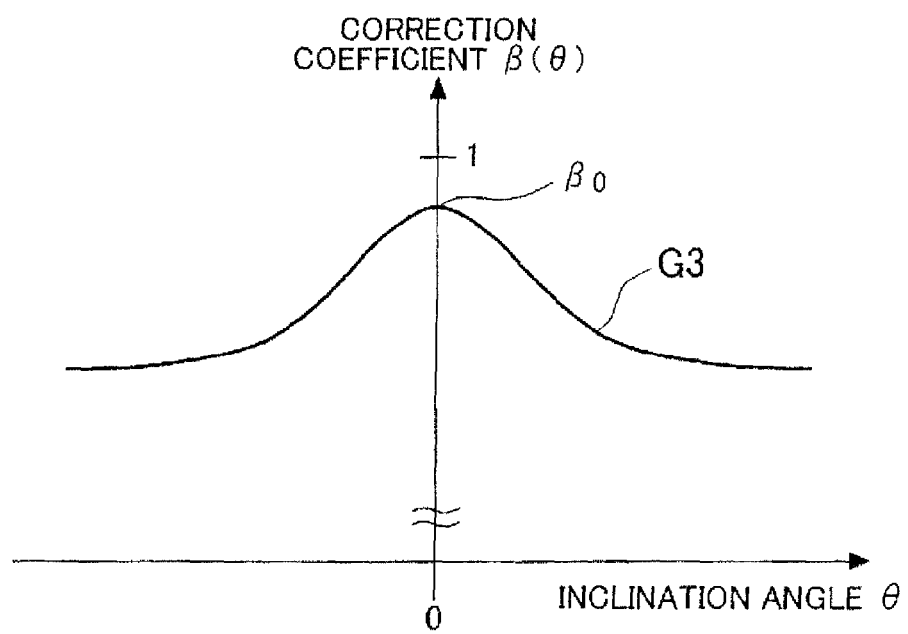

FIGS. 12A and 12B are graphs showing an example of results of the measurement of the correction coefficient β(θ) of the thermoviewer 4. FIG. 12A is a graph G2 showing a relationship between the inclination angle θ and the detected temperature TS(θ), and FIG. 12B is a graph G3 showing a relationship between the inclination angle θ and the correction coefficient β(θ). As shown in the graph G2 of FIG. 12A, the larger the absolute value of the inclination angle θ is, the lower the detected temperature TS(θ) is. Besides, as shown in the graph O3 of FIG. 12B, the larger the absolute value of the inclination angle θ is, the smaller the correction coefficient β(θ) is.

In this manner, the cylindrical test piece 7 made of substantially the same material as that for the measurement object 5 is uniformly heated to the pre-set temperature TQ, and is disposed at substantially the same position as that of the measurement object 5. Then, the distribution of the temperature TS(θ) in the surface of the test piece 7 is detected by the thermoviewer 4, and the correction coefficient β(θ) is found from the detected distribution of the temperature TS(θ) in the surface of the test piece 7. Therefore, a relationship between the inclination angle θ of the measurement object 5 and the correction coefficient β(θ) can easily be found by using the strain measurement apparatus 100.

Although the description of this embodiment has been made in the case where the test piece 7 is formed in a cylindrical shape, the test piece 7 may also be formed in a shape other than the cylindrical shape. For example, the test piece 7 may also be formed in a flat platy shape, and the test piece 7 may be turned about a center axis of the test piece 7 that is parallel with the y-axis direction (the direction orthogonal to the sheet of FIG. 10) to change the inclination angle θ, and the temperature TS on the surface of the test piece may be found for each inclination angle θ. In this case, the relationship between the inclination angle θ and the correction coefficient β(θ) can be more accurately determined.

Although the description of this embodiment has been made in the case where the strain measurement apparatus 100 includes the actual strain calculation portion 12, the correction coefficient storage portion 14, the temperature correction portion 15, the expansion coefficient storage portion 16, the free thermal strain calculation portion 17 and the constraint strain calculation portion 18 as the function portions in the computer 1, the strain measurement apparatus 100 may have a configuration in which at least one of the function portions that are the actual strain calculation portion 12, the correction coefficient storage portion 14, the temperature correction portion 15, the expansion coefficient storage portion 16, the free thermal strain calculation portion 17 and the constraint strain calculation portion 18 is implemented in the form of hardware, such as an electronic circuit or the like.

The invention can be used for a strain measurement apparatus, a linear expansion coefficient measurement method, and a correction coefficient measurement method for a thermoviewer.

The thermoviewer may be disposed adjacent to the first camera or the second camera.

According to the strain measurement apparatus having the above-described configuration, since the thermoviewer is disposed adjacent to the first camera or the second camera, the "constraint strain" can easily be measured.

That is by measuring the actual strain by using the camera disposed adjacent to the thermoviewer as a reference, it becomes easy to carry out the positional alignment of a lattice point at which the actual strain is to be found and a lattice point at which the free thermal strain is to be found. Therefore, the "constraint strain" can more easily be measured.

Furthermore, the strain measurement apparatus may further include an expansion coefficient storage portion that stores the linear expansion coefficients of the measurement object in association with the temperatures of the measurement object, and the free thermal strain calculation portion may be configured to read the linear expansion coefficients that correspond to the temperatures included in the temperature distribution detected by the thermoviewer, from the expansion coefficient storage portion, and use the linear expansion coefficients to find the free thermal strain.

According to the strain measurement apparatus having the above-described configuration, the linear expansion coefficient of the measurement object and the temperature of the measurement object are stored in association with each other in the expansion coefficient storage portion, and the linear expansion coefficients (see FIG. 9) that correspond to the temperatures included in the temperature distribution detected by the thermoviewer are read from the expansion coefficient storage portion so as to find the free thermal strain. Therefore, the free thermal strain can easily be found.

Furthermore, the strain measurement apparatus may further include: a correction coefficient storage portion that stores correction coefficients for correcting the temperatures included in the temperature distribution detected by the thermoviewer, in association with inclination angles, each of which is an angle formed between a plane orthogonal to a direction of a sight line from the thermoviewer to the measurement object and the surface of the measurement object; and a temperature correction portion configured to find the inclination angles from the three-dimensional configuration of the measurement object found by the actual strain calculation portion, read from the correction coefficient storage portion the correction coefficients that correspond to the found inclination angles, and use the read correction coefficients to correct the temperature distribution detected by the thermoviewer, and the free thermal strain calculation portion may be configured to find the free thermal strain from the temperature distribution corrected by the temperature correction portion.

According to the strain measurement apparatus having the above-described configuration, the correction coefficients for correcting the temperatures included in the temperature distribution detected by the thermoviewer are stored in the correction coefficient storage portion in association with the inclination angles, each of which is the angle formed between a plane orthogonal to the direction of the sight line from the thermoviewer to the measurement object and the surface of the measurement object, the inclination angles are found from the three-dimensional configuration of the measurement object, and the correction coefficients (see FIGS. 12A and 12B) that correspond to the found inclination angles are read from the correction coefficient storage portion, and the temperature distribution detected by the thermoviewer is corrected by using the read correction coefficients. Then, the free thermal strain is found from the corrected temperature distribution. Therefore, the free thermal strain can accurately and easily be found.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A strain measurement apparatus comprising:
   a stereo camera device that produces a first stereo image and a second stereo image of a measurement object;
   an actual strain calculation portion configured to find a three-dimensional configuration of the measurement object from the first stereo image and the second stereo image to find actual strain of the measurement object;
   a temperature distribution detector that detects a temperature distribution of the measurement object;
   a correction coefficient storage portion that stores correction coefficients for correcting temperatures included in the temperature distribution detected by the temperature distribution detector, in predetermined association with inclination angles, each of which is an angle formed between a plane orthogonal to a direction of a sight line from the temperature distribution detector to the measurement object and a surface of the measurement object; and
   a temperature correction portion configured to find the inclination angles from the three-dimensional configuration of the measurement object found by the actual strain calculation portion, read from the correction coefficient storage portion the correction coefficients that correspond to the found inclination angles, and use the read correction coefficients to correct the temperature distribution detected by the temperature distribution detector;
   a free thermal strain calculation portion configured to find free thermal strain of the measurement object from the corrected temperature distribution corrected by the temperature correcting portion; and
   a constraint strain calculation portion configured to find as constraint strain of the measurement object a difference obtained by subtracting the free thermal strain found by the free thermal strain calculation portion from the actual strain found by the actual strain calculation portion.

2. The strain measurement apparatus according to claim 1, further comprising:
   an expansion coefficient storage portion that stores linear expansion coefficients of the measurement object in association with temperatures of the measurement object, wherein
   the free thermal strain calculation portion is configured to read the linear expansion coefficients that correspond to temperatures included in the temperature distribution detected by the temperature distribution detector from the expansion coefficient storage portion, and use the linear expansion coefficients to find the free thermal strain.

3. The strain measurement apparatus according to claim 1, wherein
   the stereo camera device includes a first camera that produces the first stereo image and a second camera that produces the second stereo image and that is disposed at a position apart from the first camera.

4. The strain measurement apparatus according to claim 2, wherein the temperature distribution detector is disposed adjacent to the first camera or the second camera.

5. A linear expansion coefficient measurement method that finds a relationship between temperature of a measurement object and a linear expansion coefficient, by using the strain measurement apparatus according to claim 1, the method comprising:
   uniformly heating a test piece that is made of a material identical to a material for the measurement object and on which marks are formed at at least two positions, to a pre-set temperature, and disposing the test piece at a position substantially identical to a position of the measurement object;
   finding a distance between two marks of the marks formed on the test piece, by using at least one of the first stereo image and the second stereo image; and
   finding a linear expansion coefficient from the found distance between the two marks.

6. The linear expansion coefficient measurement method according to claim 5, wherein
the uniformly heating and disposing the test piece, the finding the distance, and the finding the linear expansion coefficient are repeatedly performed.

7. A correction coefficient measurement method for a temperature distribution detector that, by using the strain measurement apparatus according to claim 1, finds a relationship between an inclination angle that is an angle formed between a plane orthogonal to a direction of a sight line from the temperature distribution detector to the measurement object and a surface of the measurement object and a correction coefficient of the temperature distribution detector, the method comprising:
uniformly heating a cylindrical test piece made of a material identical to a material for the measurement object to a pre-set temperature, and disposing the test piece at a position substantially identical to a position of the measurement object;
detecting a temperature distribution in a surface of the test piece by the temperature distribution detector; and
finding the correction coefficient from the detected temperature distribution in the surface of the test piece.

8. A strain measurement method comprising:
producing a first stereo image and a second stereo image of a measurement object with the use of a stereo camera device;
finding a three-dimensional configuration of the measurement object from the first stereo image and the second stereo image to find actual strain of the measurement object;
detecting a temperature distribution of the measurement object with the use of a temperature distribution detector;
storing correction coefficients for correcting temperatures included in the detected temperature distribution, in predetermined association with inclination angles, each of which is an angle formed between a plane orthogonal to a direction of a sight line from the temperature distribution detector to the measurement object and a surface of the measurement object;
finding the inclination angles from the found three-dimensional configuration of the measurement object;
reading the found correction coefficients that correspond to the found inclination angles; and
using the read correction coefficients to correct the detected temperature distribution
finding free thermal strain of the measurement object from the corrected temperature distribution; and
finding as constraint strain of the measurement object a difference obtained by subtracting the found free thermal strain from the found actual strain.

9. The strain measurement method according to claim 8, further comprising:
storing linear expansion coefficients of the measurement object in association with temperatures of the measurement object, wherein
the finding the free thermal strain includes reading and using linear expansion coefficients that correspond to temperatures included in the detected temperature distribution.

* * * * *